L. F. ADT.
LENS MOUNT FOR EYEGLASSES.
APPLICATION FILED MAR. 23, 1905.

964,732.

Patented July 19, 1910.

Witnesses
Walter B Payne
Clarence J Bateman

Inventor
Leo F Adt
By Frederick S Church
his Attorney

UNITED STATES PATENT OFFICE.

LEO F. ADT, OF TROY, NEW YORK.

LENS-MOUNT FOR EYEGLASSES.

964,732.  Specification of Letters Patent.  Patented July 19, 1910.

Application filed March 23, 1905. Serial No. 251,579.

*To all whom it may concern:*

Be it known that I, LEO F. ADT, of Troy, in the county of Rensselaer and State of New York, have invented certain new and useful Improvements in Lens-Mounts for Eyeglasses; and I do hereby declare the following to be a full, clear, and exact description of the same, reference being had to the accompanying drawings, forming a part of this specification, and to the reference-numerals marked thereon.

The object of my present invention is to provide an improved and inexpensive lens mount for use in attaching the bridge, guards and other parts comprising the mountings of eyeglasses and spectacles to the lenses, whereby lenses varying considerably in thickness may be readily accommodated without the inconvenience and expense of keeping on hand a large supply of parts having lens-attaching portions of various sizes for different thickness of lenses.

To these and other ends the invention consists in certain improvements and combinations of parts all as will be hereinafter more fully explained, the novel features being pointed out in the claims at the end of the specification.

Figure 1:
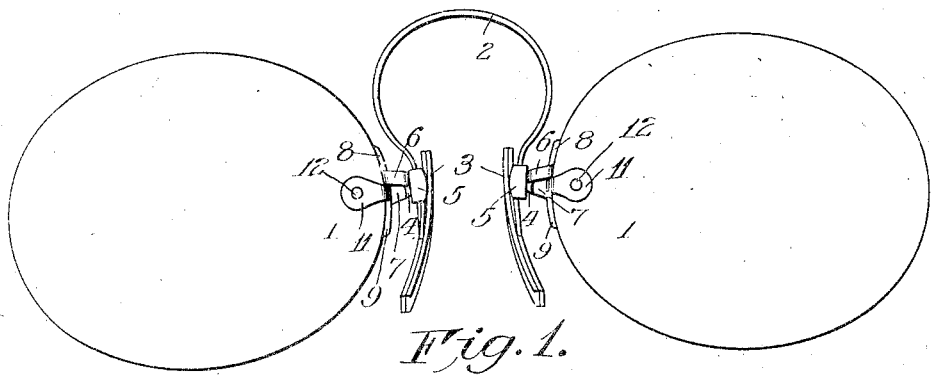
Figure 2:
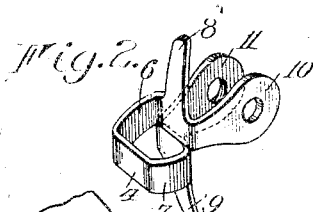
Figure 3:
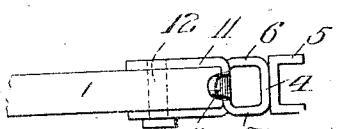
Figure 6:
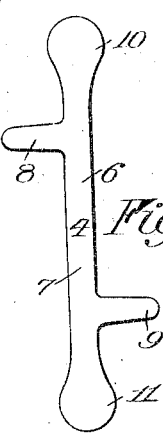
Figure 4:
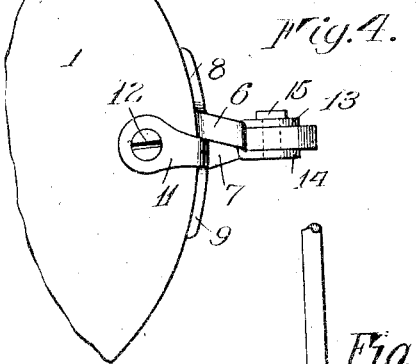
Figure 7:
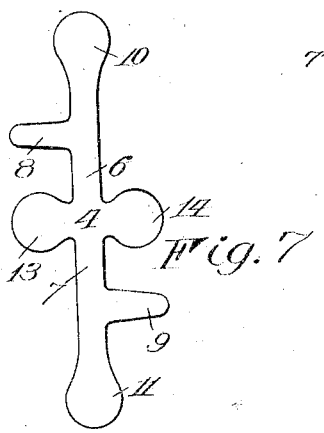
Figure 5:
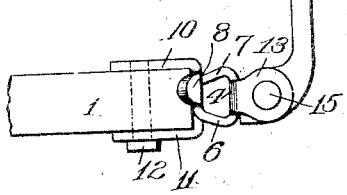

In the drawing: Figure 1 is a view of a pair of eyeglasses, the mounting of which is provided with lens mounts constructed in accordance with my invention; Fig. 2 is a perspective view of the mount removed from the lens and mounting; Fig. 3 is a plan view of the lens mount and a portion of a lens; Figs. 4 and 5 are detail views in elevation and plan respectively, showing the lens mounts adapted for attaching the temple clasps of spectacles to the lenses; and Figs. 6 and 7 are diagrams of the blanks from which the lens mounts for eyeglasses such as shown in Figs. 1, 2 and 3, and those for spectacles as shown in Figs. 4 and 5, respectively may be formed.

The same numerals of reference in the several figures indicate similar parts.

In Figs. 1, 2 and 3 I have shown the preferred form of my invention applied to the well known type of eyeglasses comprising the lenses 1 connected by the bridge spring 2 and provided with the nose guards 3 for engaging the wearer's nose.

The improved lens mounts for connecting the spring and guards to the lenses embody in the present instance, a central portion 4 adapted to receive the spring and guard attaching box 5 by soldering or otherwise, and the arms 6 and 7 extend laterally substantially at right angles from the forward and rear ends of the portion 4, for a given distance, and are then bent so as to cross one above the other and form bearing surfaces for the lens edge which if desired may be enlarged by the upper and lower extensions 8 and 9 forming lens edge bearing ears. The ends of the arms 6 and 7 are again bent substantially parallel with the lenses to form the attaching arms 10 and 11 bearing on the opposite faces of the lens and provided with apertures to receive the usual screw or other fastening device 12. This form of the mounting may be readily bent into shape from a blank punched from sheet material such as that shown in Fig. 6, the box or other device for attaching the spring and guards to the mounting being soldered or otherwise secured to the central portion 4 preferably after the mount has been formed.

In applying the invention to spectacles employing the temple clasps and bridge which are usually permanently connected to the lenses, the central portion 4 of the mount may be readily adapted to receive the temple clasps by forming the apertured ears 13 and 14 extending at right angles from the upper and lower edges of the said portion, the pivot or hinge piece of the temple clasps being inserted between these attaching ears and secured by the pin 15 in the usual way; and in attaching the bridge to the mounts the bridge-ends may be soldered or otherwise attached to the central portion of the mount formed similarly to that shown in Fig. 2.

In forming the mounts to receive the temple clasps, a blank punched from sheet material having substantially the shape shown in Fig. 7 may be employed, in which case the ears 13 and 14 arranged laterally thereof are bent up parallel and substantially at right angles to the body of the blank.

Lens mounts constructed in accordance with my invention may be readily adjusted to accommodate lenses of varying thicknesses in such a way that the fastening screw apertures of the mount and of the lens may be brought into register and the bearing portions for engaging the lens edge will remain firmly in contact with the lens, the edge bearing ears being provided or omitted as desired, for by looping the arms in the manner described and crossing them so that their attaching portions will engage upon the reverse sides of the lens, an ample length of material is supplied to these arms to enable the optician to bend them relatively to each other in a direction transversely of the lens to separate the attaching lugs to accommodate lenses of different thicknesses without disturbing the register between the apertures of the attaching lugs and that of the lens, nor will it change the relation between these apertures and the lens-edge bearing shoulders.

As it is preferable generally to adjust both of the arms to vary the space between the attaching lugs, the lenses will always be positioned centrally of the mount instead of at one side thereof, and forces tending to bend the lenses laterally as well as vertically will be effectually resisted by these crossed arms.

Lens mounts constructed in accordance with my invention whether they are to be applied to eyeglasses or spectacles, may be readily manufactured from blanks of sheet material, and the cost of production is relatively small.

I claim as my invention:

1. In eyeglasses and spectacles, a lens mount embodying a looped portion having its arms crossed and arranged to clamp against the opposite faces of a lens.

2. In eyeglasses and spectacles, a lens mount embodying a looped portion having its arms crossed and formed to engage the opposite surfaces of a lens, intermediate portions of the arms forming bearing surfaces for the lens edge.

3. In eyeglasses and spectacles, a lens mount embodying a body portion having arms crossed one above the other and having lateral extensions forming bearing surfaces for the lens edge, the ends of the arms forming attaching lugs for the lens.

4. In eyeglasses and spectacles, the combination with a lens having an aperture near the edge, of a lens mount comprising a body portion and the apertured attaching arms for engaging the opposite faces of a lens, the arms being crossed intermediate the body portion and their points of attachment, and capable of being adjusted in a direction transversely of the lens, and a fastening device passing through the apertures of the arms and lens.

5. In eyeglasses and spectacles, the combination with a lens, of a lens mount comprising a body portion having a connection for eyeglass or spectacle mountings, arms crossing each other and forming bearing surfaces for the lens edge, and lens-attaching lugs carried by said arms.

6. In eyeglasses and spectacles, the combination with a lens, of a lens mount comprising a body portion, and arms connected to the body portion crossing each other and engaging on the reverse faces of the lens, and a fastening device for drawing the attaching portions of the arms against the lens faces.

7. In eyeglasses and spectacles, a lens mount composed of pliable flat material comprising a looped body portion having crossed arms arranged edgewise of the material, and attaching lugs formed by bending the arms flatwise and arranged to engage the lens faces.

8. In eyeglasses and spectacles, a lens mount formed of a blank of sheet material comprising a body portion having arms extending in opposite directions therefrom and provided at their extremities with attaching lugs, and offset lens edge-bearing extensions at opposite sides of the said arms.

9. In eyeglasses or spectacles, a lens mount embodying a looped portion having an attaching arm at each end, said arms being arranged to coöperate with opposite faces of a lens and lens bearing portions, one extending from each arm of the loop at an intermediate point thereof.

10. In eyeglasses or spectacles, a lens mount embodying a looped portion having an attaching arm at each end, said arms being arranged to coöperate with opposite faces of a lens and a lens edge bearing portion at an intermediate point on each arm of the loop.

11. In eyeglasses or spectacles, a lens mount comprising a central portion and an arm extending laterally from each end of the central portion and each carrying a lens edge bearing portion and an attaching arm, the attaching arms being arranged to coöperate with opposite faces of a lens.

12. A blank for lens mounting comprising a central portion, ears extending from opposite sides thereof and arms extending from the central portion and each having a lens-edge bearing portion and a lens attaching arm, the lens attaching arms being adapted to coöperate with the opposite faces of a lens.

LEO F. ADT.

Witnesses:
MICHAEL F. O'CONNOR,
H. O. BAILEY.